(No Model.) 3 Sheets—Sheet 1.

W. S. JOHNSON.
SYSTEM OF TEMPERATURE REGULATION.

No. 352,874. Patented Nov. 16, 1886.

(No Model.) 3 Sheets—Sheet 2.

W. S. JOHNSON.
SYSTEM OF TEMPERATURE REGULATION.

No. 352,874. Patented Nov. 16, 1886.

Witnesses:
E. G. Amus
N. E. Oliphant

Inventor:
Warren S. Johnson
By Stout & Underwood
Attorneys.

(No Model.)  3 Sheets—Sheet 3.

W. S. JOHNSON.
SYSTEM OF TEMPERATURE REGULATION.

No. 352,874. Patented Nov. 16, 1886.

Witnesses:
E. G. Asmus
N. E. Oliphant

Inventor:
Warren S. Johnson
By Stout & Underwood
Attorneys.

UNITED STATES PATENT OFFICE.

WARREN S. JOHNSON, OF MILWAUKEE, WISCONSIN, ASSIGNOR TO THE JOHNSON ELECTRIC SERVICE COMPANY, OF SAME PLACE.

SYSTEM OF TEMPERATURE-REGULATION.

SPECIFICATION forming part of Letters Patent No. 352,874, dated November 16, 1886.

Application filed April 20, 1886. Serial No. 199,476. (No model.)

*To all whom it may concern:*

Be it known that I, WARREN S. JOHNSON, of Milwaukee, in the county of Milwaukee, and in the State of Wisconsin, have invented certain new and useful Improvements in Systems of Temperature-Regulation; and I do hereby declare that the following is a full, clear, and exact description thereof.

My invention relates to a system of temperature-regulation; and it consists in certain combinations of devices, as will be fully described hereinafter, and pointed out in the claims.

Figure 1:
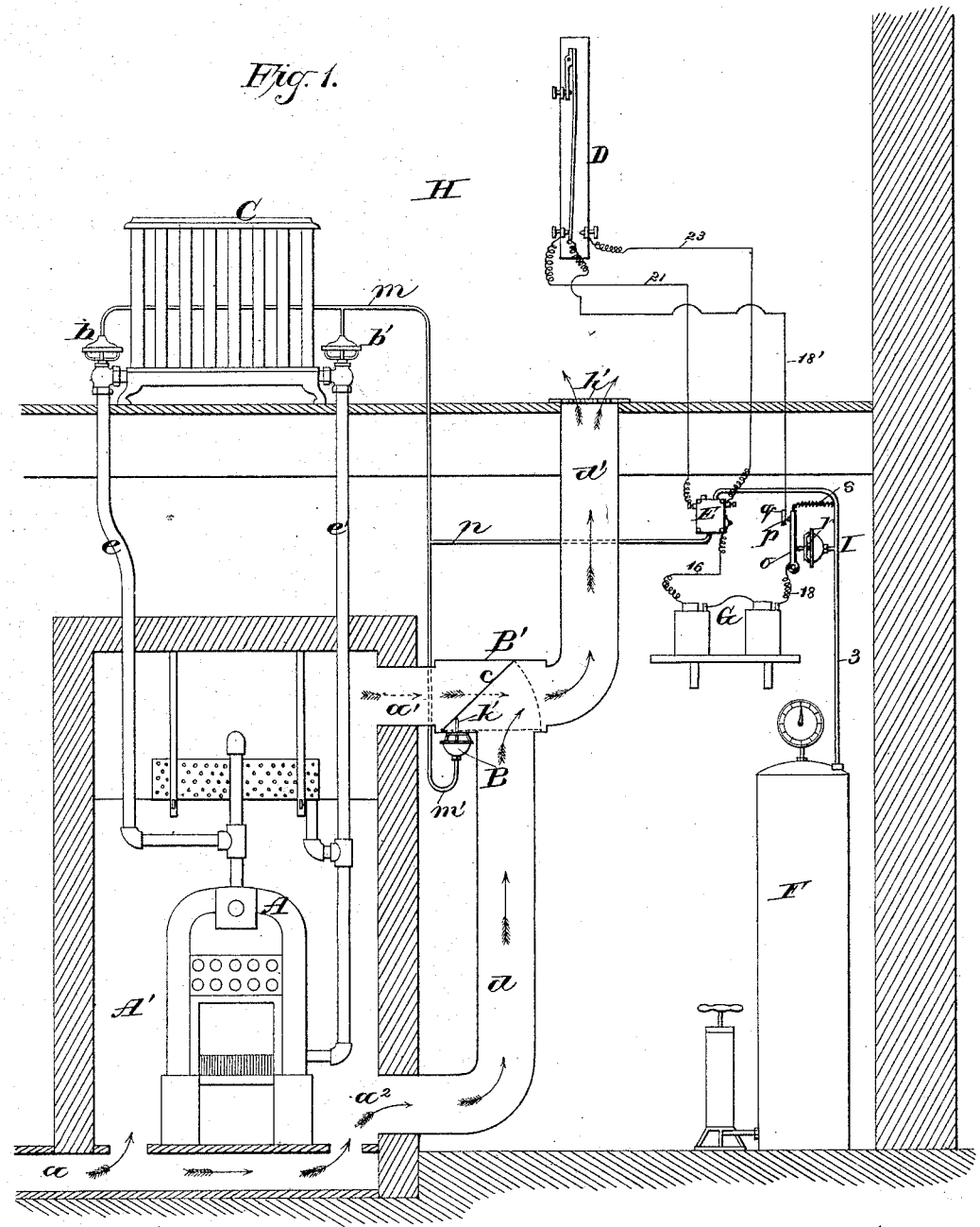
Figure 2:
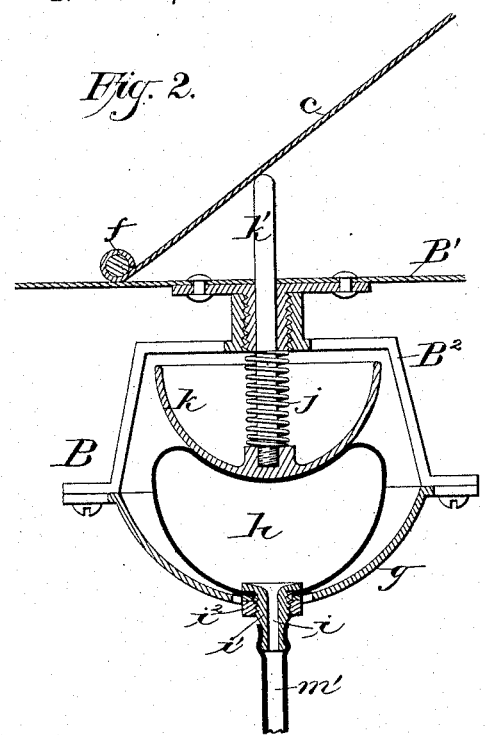
Figure 3:
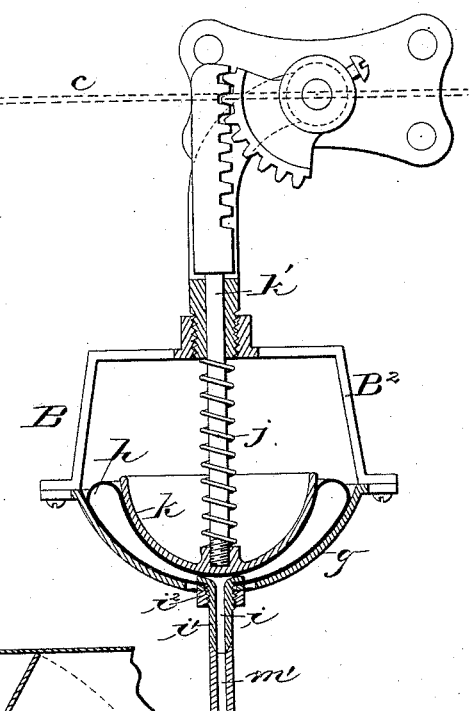
Figure 4:
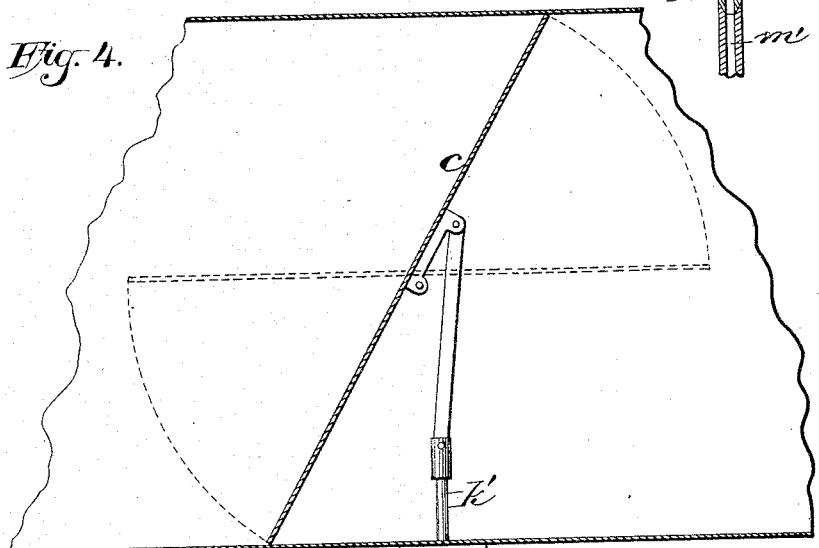
Figure 5:
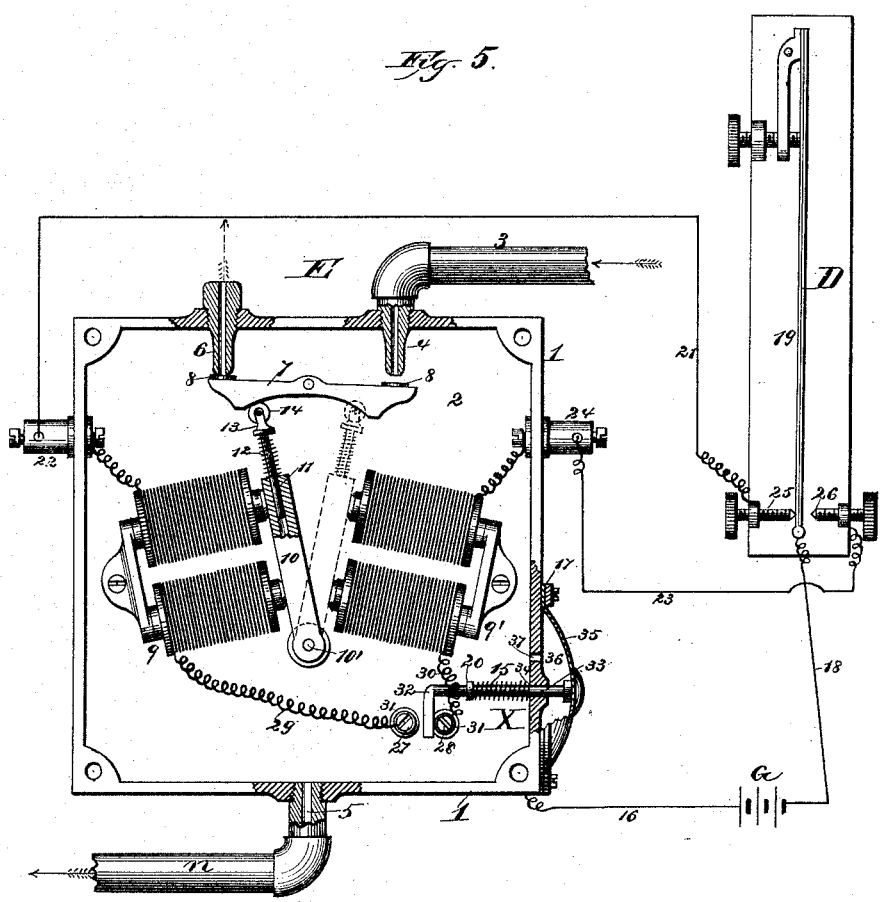

In the drawings, Figure 1 is a general view illustrating my said system. Figs. 2, 3, and 4 illustrate various mechanical devices used in my said system; and Fig. 5 is a detail view of the electro-pneumatic valve employed therein.

My invention consists, primarily, in a system of devices whereby some fluid under pressure—as compressed air—is used to control valves, whereby the heating of a room may be regulated. The fluid under pressure is controlled by electricity, and the circuits for the current of electricity are controlled by a thermostat situated in the room where it is desired to regulate the heat.

Patents have previously been granted to myself and others for heat-controlling devices; but this present invention differs from such former inventions in two things: first, in the small electric valve which controls the fluid under pressure, and, second, in the device for controlling both the direct or radiating form of heating in the room at the same time as it controls the indirect or ventilating form of heating.

A is the boiler, with its surrounding air-chamber A', where the air for ventilation is warmed.

B is the device for operating the damper or valve which controls the air for ventilating the apartment H.

C is the direct steam-radiator, for the purpose of giving the greater amount of heat to the room.

F is a reservoir of compressed air.

The chamber A' of the heating-boiler is provided with an air-inlet, $a$, which communicates with the external atmosphere, and is also provided with upper and lower outlets, $a'$ $a^2$, respectively, the former being continued into a horizontal pipe-section, B', which communicates through pipe $d$ with the lower outlet, $a^2$, and through pipe $d'$ with the apartment H through a suitable register, $h'$. The valve-operating device B is located just under the pipe-section B', and operates the damper or valve $c$, as hereinafter explained, to control the passage of air from the chamber A' to the apartment H, through the outlet $a'$ or $a^2$, as desired. If the damper $c$ is pushed up against the upper part of the pipe-section B', the outlet $a'$ is closed, and hence the air admitted to the chamber A' will pass directly out of the outlet $a^2$ and through pipes $d$ and $d'$ and register $h'$ into the apartment H without being heated; but on the other hand, if the damper $c$ is permitted to drop down upon the lower part of the pipe-section B', then the passage of air from pipe $d$ to pipe $d'$ is intercepted and the air is compelled to seek an outlet through $a'$, being forced through the boiler-chamber A' and warmed in its passage, so that it enters the apartment H, through pipe $d'$ and register $h'$, in a heated condition.

The steam-radiator C, situated in the apartment H, is connected with the boiler A by means of steam-pipe $e$ and return-pipe $e'$. The entrance of the steam to the radiator C is controlled by the valve $b$, and the exit of the water of condensation is controlled by the valve $b'$.

E is a small electro-pneumatic valve which governs the releasing of the compressed air, which in turn controls the valves B $c$ and $b$ $b'$.

G is the electric battery which furnishes the current, and D is the thermostat which by means of slight variations of temperature makes electric circuits which operate the valve E.

I is the circuit-breaking device, hereinafter described.

The valves $b$ and $b'$ are each fitted with an expansible chamber, so connected with the valve rod or stem that when the expansible chamber is filled with compressed air the valve is closed, and when the compressed air is released from the chamber the valve opens.

I do not deem it necessary to further describe the valves $b$ and $b'$, as their construction forms no part of my present invention, and I have often described them before in my previous patents.

The valve B c is operated in a manner somewhat similar, as will be seen by referring to Fig. 2. In this figure, c is the valve-damper, hinged to the pipe-section B' at f; also attached to the pipe-section is the frame B², which supports the valve-operating device B. This latter consists of a cup or casing g, above which is a flexible ball, h, having a vent, i, at its base, formed in a nozzle, i', which screws into a bushing, i², the edges of the rubber ball around its perforation being held between the flanges of the nozzle, and a washer on said bushing, and the said nozzle being dropped down through a hole in the bottom of the casing g, all as shown in said Fig. 2. Pressed against the ball h by means of the spring j is the cup k, which bears the rod k', projecting up through an opening in the pipe-section B', and striking against the damper c. As shown in Figs. 1 and 2, the ball h is so expanded with compressed air as to push up the cup k, compress the spring j and force up the damper c, so as to close off the entrance of air into the pipe d' from the outlet a'. When the compressed air is released from the ball h, the damper c will fall by means of gravity, and the ball h will be compressed by the spring j. The expansible chambers of the valves b and b', and the ball h of valve-operating device B are all connected by the pipes m and m' to the air-pipe n, which leads to the electro-pneumatic valve E. By this arrangement when the compressed air operates to shut the valves b and b', it will also operate to move the damper c, so that when the steam is shut off from the radiator C the heated air is also shut off from the pipe d', and no further heat can enter the apartment H. The pipes d and d' now form one continuous open passage, and hence a current of cold air from the inlet a will enter the apartment H and supply it with fresh air.

Figs. 3 and 4 show two other methods of connecting the damper c to the ball h, so that the entrance of compressed air into the ball h will operate the said damper. In Fig. 3 the damper c is down, so as to leave the passage in the pipe-section B' (not shown) open, and in Fig. 4 the said damper is raised, and the said passage thereby closed. In Fig. 3 a rack-and-pinion segment is used, and in Fig. 4 a link connection joins the rod k' to the damper c.

Fig. 5 is a partially sectional view of the electro-pneumatic valve E. The operative parts are inclosed in an air-tight casing, 1, the cover of which is removed in the drawings. The air from the reservoir F enters the air-tight chamber 2 through the pipe 3 and nozzle 4, and passes on through the outlet 5 and pipe n to the valves to be operated. When said valves are to be opened, the air escapes through the port or nozzle 6. Facing the nozzles 4 and 6 is the rocking bar 7, having facings 8 8, of leather or other suitable substance, which serve each in turn to close either the port 4 or 6. Within the casing 1 are the electro-magnets 9 9', having the common armature 10 hinged, as at 10', so as to oscillate between them. The armature 10 is provided at its free extremity with a rod, 11, and extension-spring 12, which tends to force the rod 11 outward, said rod being provided with a head, 13, and friction-wheel 14, resting against the bar 7. When the armature is before the magnet 9, the rod 11, being projected by the spring 12, pushes the bar 7 against the port 6 and closes it. In this position of the parts the compressed air is free to pass through the pipes 3 and n to the valves to be operated, (as at b b' and B c, Fig. 1.) When the armature 10 is drawn over to the position shown in dotted lines by the magnet 9', the spring 12 will force upward the opposite end of the bar 7 and close the port 4, while the port 5 will be opened. In this position there is no longer a communication for the compressed air through the pipes 3 and n, since the port 4 is closed. The port 6 will now be opened and the compressed air which served to operate the valves b b' and B c in one direction will now escape from the port 6, and the valves b b' and B c will be operated by gravity, springs, or pressure in the opposite direction. In order to throw the armature 10 from one position to the other, the electro-magnets 9 9' are connected to two external electric circuits, respectively. These circuits are shown in Fig. 5, as from the battery G through the conductor 16 to the metallic casing 1 of the valve E. The opposite pole of the battery G is connected by means of the conductor 18 to the compound metallic bar 19 of the thermostat D. At this point the circuit is divided, one conductor, 21, leading to the magnet 9 by means of the binding-post 22, which is insulated from the casing 1, and the other circuit leads by means of the conductor 23 to the magnet 9' through the binding-post 24, which is also insulated from the casing 1.

25 and 26 are contact-screws for the two respective circuits. When the bar 19, by means of a high temperature, touches the screw 25, the circuit will be through the magnet 9, and when, by means of a decline of temperature, it touches the screw 26 the circuit will be through the magnet 9'.

The above explanation is based on the supposition that the buttons 27 and 28, to which the wires 29 and 30 are attached, are in electrical connection with the casing 1 and wire 16. If this were the case, the battery used would be in circuit so long as the bar 19 of the thermostat D was in contact with either of the screws 25 or 26. Batteries which are constantly in circuit are not suited for such purposes as this.

In order to use the current of electricity as little as possible, I employ the device shown at X. First the buttons 27 and 28 are insulated from the casing 1, so far as their attachment is concerned, by hard-rubber disks 31 31. Playing between the buttons 27 and 28 is the metallic foot 32, attached to the rod 33, which passes through the casing 1 at the point 34. The external extremity of the rod 33 is secured to a flexible diaphragm, 35, of rubber or other suitable material. The edges of this diaphragm are securely fastened to the casing 1, as shown at 17, so as to be air-tight. Communication from the interior of the diaphragm-chamber 36 is had with the chamber 2 by means of the orifice 37 in the casing 1. When all the parts are in the position shown in Fig. 5, the armature 10 being before the magnet 9, the port 4 open, and the port 6 closed, the pressure of air contained in the chamber 2 and chamber 36 will force the diaphragm 35 outward, carrying the rod 33 and its foot 32 along with it, whereby the said foot 32 is withdrawn from its normal position in contact with the button 27 and drawn into contact with the button 28, as shown. The rod 33 is not insulated from the casing 1, and therefore when the foot 32 is in contact with the button 28 there is a free electric communication from battery G through 16 1 33 32 28 30, the magnet-coils about 9', the binding-post 24, and wire 23 to contact-screw 26. Here the communication is not established through the bar 19, said bar not being in contact with 26. In this position there is no circuit. Neither can there be an electric circuit through the magnet-coils 9, for, although the circuit is closed at the thermostat D at 19 25, it is broken at 32 27. As the parts are shown in Fig. 5 the valves $b$ $b'$ and B $c$, Fig. 1, will be closed, since the fluid under pressure is free to pass through the port 4 and pipe $n$, and enter the expansible chambers, whose movable walls operate the valves $b$ $b'$ and B $c$. If, now, by means of a reduction of temperature the bar 19 in the thermostat D moves to the right against screw 26, a circuit will be established through the electro-magnet 9', the armature 10 will take the position shown in dotted lines, and the rocking bar 7 will be tilted in the opposite direction, so as to close port 4, and open the exhaust-port 6. The pressure which operates the valves $b$ $b'$ and B $c$ will be released, and the valves $b$ and $b'$ and B $c$ will be opened to admit a supply of heat to the apartment H, in which the thermostat D is placed. At the same time the pressure having been released from the diaphragm 35, the spring 15, pressing against the collar 20 on the rod 33, will move the metallic foot 32 from the button 28 and break the circuit at that point, thus saving the continuous use of the battery G.

So far as I have described my invention, there is one contingency which is not provided for. It will be observed that if, from any accident or other cause, the pressure in the reservoir should fall to a point too low to operate the diaphragm 35, so as to fail to pull out the rod 33 against the spring 15, then the contact between 27 and 32 would not be broken at the proper time, and thus the battery G would be left in circuit and thereby destroyed. To obviate this possible contingency, I provide another circuit-breaking device, (shown at I, Fig. 1.) To one of the battery-wires, as 18, there is attached the metallic lever $o$. This lever has a contact-point at $p$, which presses against the button $q$, and completes the circuit to the thermostat through the wire 18'. The lever $o$ is held in contact with the button $q$ by the pressure of air in the expansible chamber $r$. If, from any cause, the air-pressure in the reservoir F is reduced, the expansible chamber $r$ will collapse, and the spring $s$ will draw the lever $o$ from the button $q$ and break the electric circuit, which cannot again be established until the adequate pressure is again obtained in the reservoir F. This prevents the waste of battery which would otherwise occur if the circuit-breaking device (shown in Fig. 5) were not properly operated for want of air-pressure.

Having thus fully described my invention, what I claim as new, and desire to secure by Letters Patent, is—

1. In combination with the valves which control the direct heating of an apartment, and the valves which control the admission of air to said apartment, all of said valves being operated by fluid-pressure, of an electrically-actuated secondary valve which controls the compressed fluid by which the main valves are operated, suitable circuit-closing devices, electric circuits, battery, and reservoir for the fluid under pressure, whereby the closing of the electric circuit will operate the secondary valve, and thus allow the fluid-pressure to operate the main valves on the direct heating device, and at the same time operate the valves which govern the admission of air to said apartment, substantially as set forth.

2. In a system of temperature-regulation, the combination, with the steam-valves controlling the direct heating of an apartment, and the air-dampers controlling the admission of air to said apartment, of an electrically-actuated secondary valve adapted to admit a fluid under pressure into expansible chambers which operate by their movable walls the valves on the direct heating device, and the valves which control the admission of air to the apartment, said expansible chambers, a battery, electric circuits, and circuit-closing devices, whereby the completion of the electric circuit operates the secondary valve, and by its means the main valves, and serves to control the admission of air into the apartment at the same time that the direct steam-valves are operated, substantially as set forth.

3. In a system of temperature-regulation, the combination, with valves operated by fluid-pressure, of a secondary electrically-actuated valve, which controls the main valves by fluid-pressure, a circuit-closing device, which serves to complete the electric circuits which operate the secondary valve, and a circuit-breaking device also operated by the fluid which is governed by the secondary valve, whereby the closing of the circuit by the circuit-closing device operates the secondary and thus the main valves and breaks said circuit by the action of the fluid under pressure at a point distinct from the point at which the circuit was closed, substantially as set forth.

4. In an electrically-actuated valve, the combination, with the valve proper, of a circuit-closing device and a circuit-breaking device operated by a fluid-pressure controlled by said valve and distinct from said circuit-closing device, whereby the completion of the electric circuit by the circuit-closing device will operate the valve and allow the circuit-breaking device to break the circuit by means of fluid-pressure, substantially as set forth.

5. In an electrically-actuated valve, the combination, with said valve, of a circuit-closing device for operating said valve, and two circuit-breaking devices, one of said circuit-breaking devices serving, by means of a fluid-pressure controlled by the electrically-actuated valve, to break the circuit each time that it is made by the circuit-closing device, and the other circuit-breaking device serving to permanently break the circuit when the fluid-pressure is exhausted, substantially as set forth.

6. In a system of temperature-regulation, the combination, with valves controlling the heat supplied to an apartment, said valves being operated by fluid-pressure, of an electrically-actuated secondary valve, which controls the fluid-pressure, a thermostat which makes the electric circuits controlling the secondary valve, and a circuit-breaking device operated by the fluid under pressure which has passed through and is governed by said secondary valve, said circuit-breaking device serving to break the electric connection at one point while it remains closed at the thermostat, substantially as set forth.

7. In a system of temperature regulation, the combination, with valves controlling the heat supplied to an apartment, said valves being operated by fluid-pressure, of an electrically-actuated secondary valve which controls the fluid-pressure, a thermostat located in the apartment heated, a circuit-breaking device operated by fluid-pressure, said circuit-breaking device serving to break the electric connection while the connection remains intact at the thermostat, and a second circuit-breaking device also operated by pressure, whereby when the pressure is exhausted the circuit will be permanently broken by the second circuit-breaking device and remain broken until said pressure is restored, substantially as set forth.

8. In an electric valve for controlling fluid under pressure, the combination, with the valve proper, of two electric circuits serving to operate the valve in opposite directions when first one and then the other circuit is energized, each of said circuits being provided with a circuit-closing device and a separate and distinct circuit-breaking device, consisting of an expansion-chamber having a movable wall and a suitable contact strip and posts, whereby the closing of one circuit at the circuit-closing device will operate the valve in one direction, and by means of the action of the fluid under pressure in the expansion-chamber break the circuit at the circuit-breaking device, and whereby the closing of the other electric circuit will operate the valve in the opposite direction, and break the electric circuit by the action of the fluid under pressure at the said circuit-breaking device, substantially as set forth.

9. In an electric valve for controlling fluid under pressure, the combination, with the valve proper, of two electric circuits serving to operate said valve in opposite directions as one or the other of the circuits is energized, each of said circuits having a circuit-closing device, and a circuit-breaking device operated by fluid-pressure, and a circuit-breaking device in the main circuit from which the opposing circuits are derived, said last circuit-breaking device serving to break the main circuit when the fluid-pressure is exhausted, substantially as set forth.

10. In an electrically-actuated valve mechanism, the combination, with the valve proper and the electro-magnetic actuating mechanism, of an initial circuit-closing device and a circuit-breaking device serving to break the circuit by the action of the fluid under pressure, which has passed through and is governed by said valve, while the circuit remains closed at the initial circuit-closing device, substantially as set forth.

11. In an electro-pneumatic valve, the combination, with a pivoted rocking bar adapted to close alternately one or the other of two ports situated adjacent to the ends of said bar, of opposing electro-magnets, an oscillating armature provided with an arm, a friction-roller carried by said arm, and a spring connected to said arm, whereby the force of the spring will keep the friction-roller always against the rocking bar, substantially as set forth.

12. The combination, with a valve which when moved in either direction opens one flue while it closes another, of an expansion-chamber suitably attached thereto, whereby the expansion or contraction of said chamber by the action of fluid-pressure will operate said valve, a secondary electrically-actuated valve which governs the fluid-pressure, suitable electric circuits, and electric generator for operating said secondary valve, whereby the energizing of an electric circuit will operate the secondary valve, and thus the main valves, so as to open one flue while it closes another, substantially as set forth.

13. In a system for controlling the heating and ventilation of apartments, the following elements in combination: (*a*) valves on the direct heating-pipes of the apartment, and valves on the pipes supplying air to said apartment, with expansion-chambers, which, through proper mechanism, serve, when expanded by a fluid-pressure, to operate said valves; (*b*) a secondary valve which controls the admission of the fluid under pressure to said chambers and its release therefrom; (*c*) a thermostat which, through proper mechanism, operates said secondary valve, whereby, by the action of the thermostat upon the secondary and thus the main valves, both the heating and ventilation of an apartment are controlled.

In testimony that I claim the foregoing I have hereunto set my hand, at Milwaukee, in the county of Milwaukee and State of Wisconsin, in the presence of two witnesses.

WARREN S. JOHNSON.

Witnesses:
H. G. UNDERWOOD,
MAURICE F. FREAR.